United States Patent
Cuffaro et al.

[15] 3,670,060
[45] June 13, 1972

[54] A METHOD FOR MANUFACTURING ARTIFICIAL MARBLE

[72] Inventors: Antonino Cuffaro; Francesco Castronovo; Achille Bruno, all of Palermo; Gianluigi Rancati, Carini, all of Italy

[73] Assignee: Medil, S.p.A., Carini, Italy

[22] Filed: Dec. 9, 1969

[21] Appl. No.: 883,620

[30] Foreign Application Priority Data

Dec. 10, 1968 Italy.................................41851 A/68

[52] U.S. Cl..............................264/77, 264/122, 264/245, 264/331, 264/338
[51] Int. Cl......................B28b 7/36, B29c 1/04, B29c 9/00
[58] Field of Search.............................264/73–77, 245–246, 264/71, 331, 338, 122

[56] References Cited

UNITED STATES PATENTS

| 3,450,808 | 6/1969 | Roberts | 264/71 |
| 3,278,662 | 10/1966 | Mangrum | 264/331 |
| 3,230,284 | 1/1966 | Iverson et al. | 264/245 |
| 3,371,135 | 2/1968 | Goodwin | 264/71 |
| 2,460,605 | 2/1949 | Soissa | 264/73 |
| 3,318,984 | 5/1967 | Dussel | 264/77 |

FOREIGN PATENTS OR APPLICATIONS

| 349,753 | 6/1931 | Great Britain | 264/77 |
| 615,209 | 1/1949 | Great Britain | 264/73 |

*Primary Examiner*—Robert F. White
*Assistant Examiner*—Jeffery R. Thurlow
*Attorney*—Waters, Roditi, Schwartz & Nissen

[57] ABSTRACT

Artificial variegated marble is produced from natural stone in particulate form, i.e. in the form of powder or granules, by a method which comprises providing individual batches of color components consisting of the particulate natural stone, powdered thermosetting resin, powdered catalyst for the resin, and a pigment, mixing together the individual batched of color components in a container to form a heterogeneous mixture wherein said individual batches still have retained their separate identities, transferring the heterogeneous mixture to another container to effect at least one re-stratification, and subjecting the mixture to a moulding treatment under increasing temperature and pressure until the resin hardens.

7 Claims, No Drawings

A METHOD FOR MANUFACTURING ARTIFICIAL MARBLE

The present invention refers to artificial stones and to their production procedure.

It is known to produce artificial stones using powder, grains, flakes and splinters of natural stones as fillers and cement, hydraulic line, gypsum as binding agents. The mixture of fillers and binders is poured into forms and extracted from them after it has hardened.

The artificial stones of this type are mostly brittle, markedly hygroscopic, not very compact and are difficult to work and to bring to a high polish. Their resistance to weathering and their light-fastness are imperfect.

Furthermore the procedures hitherto known do not lead to the production of artificial marble products, which present the fine streaking, mottling and lustre effects of true marble.

The present invention has the object of providing a procedure for the production of artificial stones, which present light-fastness and high resistance to weathering and are easily machined and polished.

The products obtained by this procedure surpass in strength and beauty not only the known artificial stones, but also many natural stones. In its further development the procedure of the invention permits the production of artificial marble, which reproduces the colors, the patterns and lustre of valuable natural marbles so perfectly, that practically it can not be distinguished from them.

The procedure according to the invention consists essentially of the following operations: intimate mixing of ground stones with thermosetting resins and, where desired, pigments, possibly with the addition of a catalyst for the resins and a dispersant for the pigments; pouring of the mixture into forms; heating of the mixture under pressure to the complete hardening of the resin, removal of the products so obtained from their forms, and, if needed, their finishing.

In a further development of the procedure for the production of artificial marble, as many single mixtures of the above composition will be used, as the finished marble will have to show separate visible color components. Each single mixture will therefore form in the finished stone a color component, whose color will be determined by the pigment added to it.

These color components will be mixed together only to that point, in which they still appear as clearly separated streaks, bandings or veins. In order to obtain the variegated patterns and the lustre which are characteristic for true marbles, the layers and shapes of the color components in the mixture are modified and altered by pouring the mixture once or repeatedly into other containers.

The composition of the single mixtures forming the color components consists, expressed in weight percents, of 70–90°, preferably 82–85 percent of powdered natural stones, preferably limestone; 28–9 percent, advantageously 15–11 percent resins in the ratio of 60:40 to 90:10, preferably 80:20; (although pure powdered melamine resin yields the best results) using paratoluene sulphonic acid, oxalic acid, phthalic anhydride, preferably zinc sulphate as a catalyst. For dyeing the mixture average of 2–0,20 percent, advantageously 0,20–1,66 percent of pigments with dispersants will be used.

For the hardening of the mixture poured into the forms, pressures in the range of 140–180kg/cm$^2$ will be used, with a starting temperature of 10–30° C., a hardening temperature of 145–160°C. The finished artificial stones will be removed from the forms after they have cooled to 25–40° C.

An example of the procedure for the production of an artificial marble with a white base component will now be given, it being understood that this example serves a purely illustrative and in no way limitative purpose.

For the production of the white base component 85 percent of a powdered white limestone, approximately 15 weight percent powdered melamine resin and 0.15 weight percent zinc sulphite as a catalyst for the resin are mixed to a homogeneous batch. Preferably the limestone here used is obtained by grinding limestones with a saccharoidal texture, to a grain size passing without residue through a sieve of 400 meshes/cm$^2$ and with a residue of not over 10 percent through a sieve with 16,400 meshes/cm$^2$. The moisture contents of the limestone must be below 4 percent.

For the preparation of the individual color components 83.5 weight percent white limestone of the above indicated grain-size and maximum moisture, 15 weight percent powdered melamine resin, 0.15 weight percent powdered zinc sulphate as a catalyst, 0.5 weight percent of a mineral oxide as a pigment and approximately 0.3 weight percent of the sodium salt of the naphthalene sulphonic acid are intimately mixed. The grain size of the pigment is preferably selected so that when passed through a grading sieve of 16,400 meshes/cm$^2$, it leaves not over 0.1 percent residue. Each batch is mixed until it assumes a uniform color.

The portions of color batches needed for the production of the desired type of marble are filled into a mixer with a funnel-shaped bottom. After a short agitation the mixture, with its color components still forming clearly recognizable colored bands and veins, is discharged through the bottom into another container, also having a downwards tapering bottom, and therefrom into the forms. This twice repeated discharging operation confers to the color components the characteristic veined and streaked patterns of true marbles.

The forms are brought into a still cold hot plate press. The pressure increase in the press is adjusted so that the maximum pressure of 155 kg/cm$^2$ is reached only after the hot plate temperature has risen to approximately 90° C. While keeping the pressure constant, the hot plates are now heated to 155° C. This temperature is maintained throughout the duration of the so-called "baking". The duration of the baking depends upon the thickness of the stone slab being produced. It must be considered, that at the above mentioned temperatures and pressures the thickness of the mixtures in the forms is reduced by approximately 35–40 percent. At the end of the baking, the hot plates in the press are cooled to approximately room temperature, whereafter the press is opened and the slabs are removed from the forms.

In order to more easily separate the finished products from the forms, a separating agent is sprayed or spread upon their internal surfaces. Especially suitable for this purpose are a paraffin emulsion, solutions of natural and artificial waxes, liquid silicones, butylphthalate, isobutylphthalate, dioctylphthalate, paraffin oil diluted with toluene or benzene, a mixture of paraffin oil and carnauba wax diluted with benzene or toluene.

The slabs so obtained are easily machined, cut and polished. Their strength, as compared to that of natural stones, is the following:

Flexure strength: 253kg/cm$^2$ (limestones with a compact texture 120kg/cm$^2$, with a granular texture 140kg/cm$^2$)

Impact strength: 0.80–0.70kg/m (natural marbles 0.20–0.30kg/m)

Abrasion strength: thickness loss 4mm (lime stone with a compact structure 6mm; with a granular structure 10mm; granite 4mm).

Obviously the present procedure is not limited to the manufacture of artificial stones which simulate natural stones, but can also be extended to the production of aggregates, which, owing to their color combinations and the outlines of their color components, produce completely new aesthetic effects. Since the mixture of the filler with its binder and pigments in each batch or color component is so complete, that each batch by itself yields aggregates of the desired strength by baking and pressing, one may renounce imitating natural marble in favor of other effects and therefore the mixture and the successive alterations of the color component layers can be replaced also by operating steps aimed at the realization of different patterns. For this reason the color components could be eventually directly poured into the moulds. To widen the possibilities of coloring, to obtain given colrs, the inorganic pigments may also be replaced by organic ones.

Similarly the procedure is not limited to the manufacture of the usual plates and slabs from artificial stones, since it is also applicable to the manufacture of different shapes of aggregates.

What is claimed is:

1. A method for manufacturing artificial marble in a variegated pattern from natural stones in particulate form comprising:
   a. providing a plurality of individual batches of color components, each batch comprising a homogeneous mixture by weight of about no–90 percent limestone in particulate form, about 28–9 percent of powdered melamine resin, a catalytic amount of a powdered catalyst for said resin, 2–0.20 percent of a pigment, and a dispersant for said pigment said batches being provided in a predetermined color and a predetermined amount to produce said variegated pattern;
   b. mixing together said batches of color components in a mixer container to form a heterogeneous mixture wherein said batches have retained separate identities, said mixer container being a standing mixer with a tapered bottom;
   c. discharging the heterogeneous mixture through the tapered bottom to another container to effect at least one re-stratification;
   d. charging said re-stratified mixture of powders to a mould;
   e. subjecting said re-stratified mixture in the mould to gradually increasing temperature and pressure to harden the resin and obtain a solid aggregate;
   f. cooling the resultant product; and
   g. recovering the aggregate from the mould.

2. A process according to claim 1, wherein each individual batch consists of: 82–85 weight percent of particulate limestone; 15–11 weight percent of powdered melamine resin; a zinc sulphite catalyst for the resin; 1.66–0.20 weight percent pigments with a dispersant for said pigments.

3. A process according to claim 1, wherein the mixture contained in the moulds is heated from a starting temperature in the range of 10–30° C. to a hardening temperature in the range of 145–160° C. under increasing pressure to obtain the hardened aggregate, and the resultant product is cooled to a temperature in the range of 25–40° C. prior to being removed from the moulds.

4. A process according to claim 3, wherein, during heating, the pressure exerted upon the mixture in the mould is increased from 0 to a maximum pressure in the range of 140–180kgcm$^2$ and said maximum pressure is maintained throughout the duration of the treatment.

5. A process according to claim 4, wherein the maximum pressure is exerted upon the mixture in the mould when said mixture has reached a temperature in the range of 70–100° C.

6. A process according to claim 1, wherein prior to the filling of the mould with said mixture, a separating agent is applied upon the interior surface of the mould, said separating agent being a member of the group wax solutions, liquid silicones, butylphtalate, isobutylphthalate, dioctylphthalate, diluted paraffin oil, and an aqueous paraffin emulsion.

7. A method in accordance with claim 1 wherein the catalyst in the color component batches is a member of the group paratoluene sulphonic acid, oxalic acid, phthalic anhydride, and zinc sulphate.

* * * * *